US012684020B2

(12) United States Patent
Wen et al.

(10) Patent No.: US 12,684,020 B2
(45) Date of Patent: Jul. 14, 2026

(54) POLICY SET FEATURE GUIDED NODE LEVEL PARTITIONING FOR POLICY SEARCH TREE OPTIMIZATION

(71) Applicant: Fortinet, Inc., Sunnyvale, CA (US)

(72) Inventors: Shushan Wen, Pleasant Hill, CA (US); Tianrui Wei, Santa Clara, CA (US); Kevin Juncheng Xu, Sunnyvale, VA (US)

(73) Assignee: Fortinet, Inc., Sunnyvale, CA (US)

( * ) Notice: Subject to any disclaimer, the term of this patent is extended or adjusted under 35 U.S.C. 154(b) by 50 days.

(21) Appl. No.: 18/964,905

(22) Filed: Dec. 2, 2024

(65) Prior Publication Data

US 2026/0156154 A1    Jun. 4, 2026

(51) Int. Cl.
*H04L 9/40*        (2022.01)
(52) U.S. Cl.
CPC ................................... *H04L 63/20* (2013.01)
(58) Field of Classification Search
None
See application file for complete search history.

(56) References Cited

U.S. PATENT DOCUMENTS

| | | | | |
|---|---|---|---|---|
| 6,970,462 B1 * | 11/2005 | McRae | ............... | H04L 47/2441 |
| | | | | 370/392 |
| 2014/0282831 A1 * | 9/2014 | Pedroza | .................. | H04L 63/20 |
| | | | | 726/1 |
| 2020/0097015 A1 * | 3/2020 | Keselman | ............ | G05D 1/0088 |
| 2023/0214388 A1 * | 7/2023 | Wen | .................... | G06F 16/2246 |
| | | | | 709/220 |

FOREIGN PATENT DOCUMENTS

WO    WO-2016125501 A1 *   8/2016   ............. G06F 16/00

\* cited by examiner

*Primary Examiner* — Sanchit K Sarker
(74) *Attorney, Agent, or Firm* — Jaffery Watson Hamilton & DeSanctis LLP

(57) ABSTRACT

Approaches policy set feature guided node level partitioning for policy search tree optimization are disclosed. A set of policy bins is generated by creating equal-width bins on a given dimension. An original policy set is scanned to determine a number of policies falling into each policy bin in the set of policy bins. An original policy set characteristic is measured based on the number of policies falling into each policy bin. Parameters that represent relationships between the policy set and another policy set are determined based on a number of policies falling into each policy bin and the policy set characteristic. A new policy set is generated based on the parameters. A new policy search tree is generated based on a new policy set. The new policy search tree provides improved build cost or improved search cost as compared a search tree based on the original policy set.

20 Claims, 12 Drawing Sheets

DETERMINE A NODE-LEVEL PARTITIONING BASED USE OF A POLICY SET FUNCTION 202

↓

GENERATE A SET OF POLICY BINS BY CREATING A NUMBER OF EQUAL-WIDTH BINS ON A GIVEN DIMENSION 204

↓

SCAN AN ORIGINAL POLICY SET TO DETERMINE A NUMBER OF POLICIES FALLING INTO EACH POLICY BIN IN THE SET OF POLICY BINS 206

↓

MEASURE AN ORIGINAL POLICY SET CHARACTERISTIC BASED ON THE NUMBER OF POLICIES FALLING INTO EACH POLICY BIN 208

↓

DETERMINE ONE OR MORE PARAMETERS THAT REPRESENT RELATIONSHIPS BETWEEN THE POLICY SET AND ANOTHER POLICY SET BASED AT LEAST ON THE A NUMBER OF POLICIES FALLING INTO EACH POLICY BIN AND THE POLICY SET CHARACTERISTIC 210

↓

SELECT THE APPROPRIATE NODE LEVEL PARTITIONING FOR THE ORIGINAL POLICY SET BASED ON THE SIMILARITY OF THE ORIGINAL POLICY SET AND OTHER KNOWN POLICY SETS 212

↓

GENERATE A NEW POLICY SEARCH TREE USING THE SELECTED NODE LEVEL PARTITIONING SCHEME, WHEREIN THE NEW POLICY SEARCH TREE PROVIDES IMPROVED BUILD COST AND/OR IMPROVED SEARCH COST AS COMPARED TO A SEARCH TREE BAED ON ONE-SIZE-FITS-ALL PARTITIONING 214

↓

DEPLOY THE NEW POLICY SEARCH TREE 216

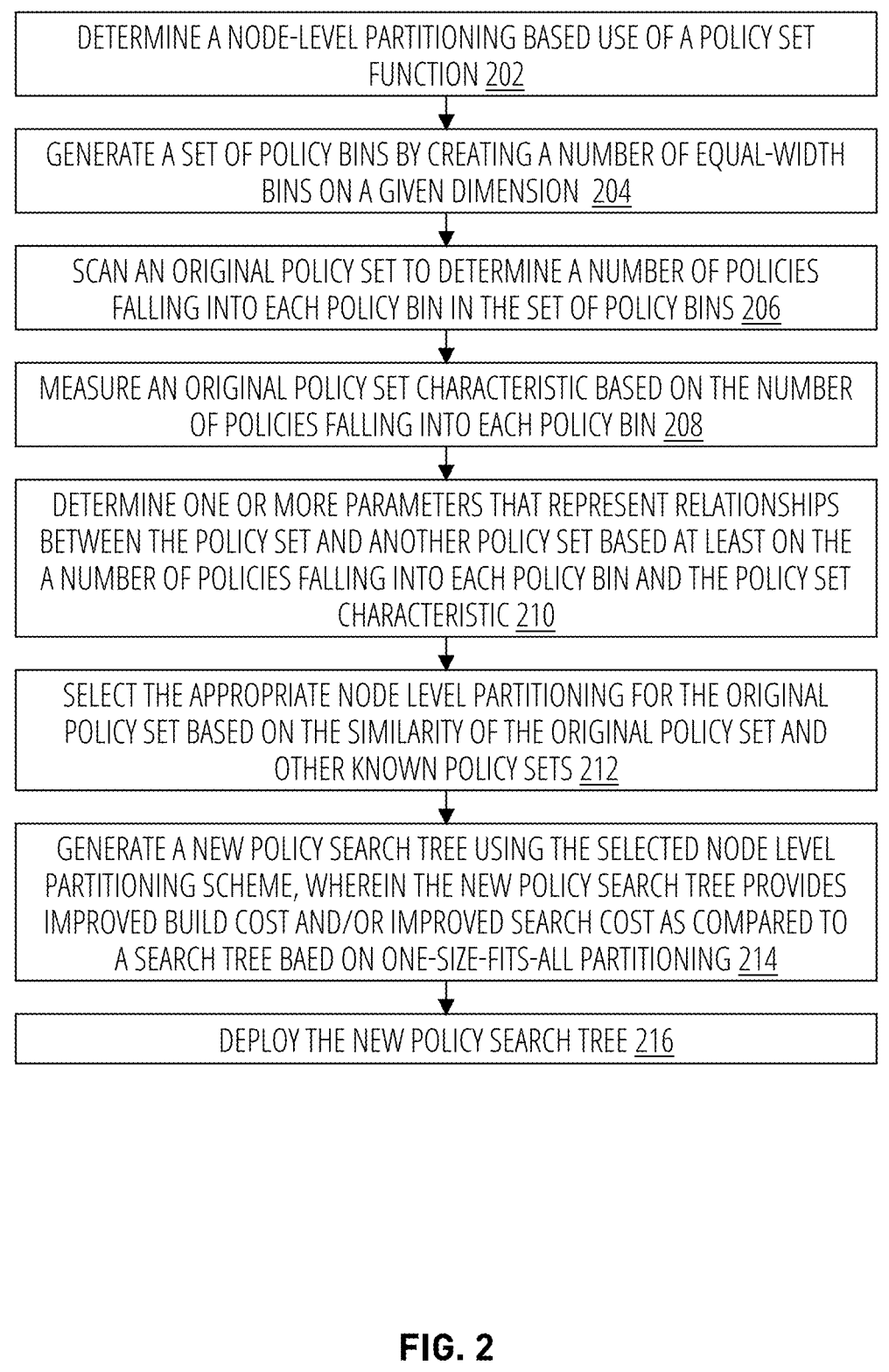

DETERMINE A NODE-LEVEL PARTITIONING BASED USE OF A POLICY SET FUNCTION 202

↓

GENERATE A SET OF POLICY BINS BY CREATING A NUMBER OF EQUAL-WIDTH BINS ON A GIVEN DIMENSION 204

↓

SCAN AN ORIGINAL POLICY SET TO DETERMINE A NUMBER OF POLICIES FALLING INTO EACH POLICY BIN IN THE SET OF POLICY BINS 206

↓

MEASURE AN ORIGINAL POLICY SET CHARACTERISTIC BASED ON THE NUMBER OF POLICIES FALLING INTO EACH POLICY BIN 208

↓

DETERMINE ONE OR MORE PARAMETERS THAT REPRESENT RELATIONSHIPS BETWEEN THE POLICY SET AND ANOTHER POLICY SET BASED AT LEAST ON THE A NUMBER OF POLICIES FALLING INTO EACH POLICY BIN AND THE POLICY SET CHARACTERISTIC 210

↓

SELECT THE APPROPRIATE NODE LEVEL PARTITIONING FOR THE ORIGINAL POLICY SET BASED ON THE SIMILARITY OF THE ORIGINAL POLICY SET AND OTHER KNOWN POLICY SETS 212

↓

GENERATE A NEW POLICY SEARCH TREE USING THE SELECTED NODE LEVEL PARTITIONING SCHEME, WHEREIN THE NEW POLICY SEARCH TREE PROVIDES IMPROVED BUILD COST AND/OR IMPROVED SEARCH COST AS COMPARED TO A SEARCH TREE BAED ON ONE-SIZE-FITS-ALL PARTITIONING 214

↓

DEPLOY THE NEW POLICY SEARCH TREE 216

FIG. 2

INITIATE ARRAY (E.G., SET POLBIN[I] TO 0 502)

RETRIEVE POLICY (P) FROM POLICY SET 504

INITIATE BIN INDEX (E.G., SET BIN_INDEX I=0) 506

DOES P OVERLAP WITH BIN[I]?? 508

NO

YES

POLBIN[I] = POLBIN[I] + 1 510

INCREMENT I 512

I >= MAX_BIN?? 514

NO

YES

LAST P IN POLICY SET?? 516

YES

NO

RETURN POLBIN 520

SET P TO NEXT POLICY 518

NARROW POLICY BINNING EXAMPLE 602

WIDE POLICY BINNING EXAMPLE 604

```
1   get_entropy(polbin, maxbin) {
2     sum_pb = 0;
3     for (i = 0; i < maxbin; i++)
4       sum_pb += polbin[i];
5     entropy = 0;
6     for (i = 0; i < maxbin; i++) {
7       if (polbin[i] > 0) {
8         r = polbin[i] / sum_pb;
9         entropy -= r * log2(r);
10      }
11    }
12    /* normalized entropy */
13    return entropy / log2(maxbin);
14  }
```

GET_ENTROPY PSEUDOCODE 702

FIG. 7A

```
1   get_variance(polbin, maxbin) {
2     sum_pb = 0;
3     for (i = 0; i < maxbin; i++)
4       sum_pb += polbin[i];
5     mu = sum_pb/maxbin;  // mean
6     var = 0;
7     for (i = 0; i < maxbin; i++) {
8       if (polbin[i] > 0) {
9         var += pow(polbin[i] - mu, 2);
10      }
11    }
12    var /= maxbin;
13    /* normalized variance */
14    return var/(pow(mu, 2)*(maxbin-1));
15  }
```

```
1   get_nlp_with_nlpb(nl_polbin, maxbin, sum, pnr) {
2     entropy = get_entropy(nl_polbin, maxbin);
3     /* or variance = get_variance(nl_polbin, maxbin); */
4     if (entropy < THRESHOLD and pnr == 2) {
5       /* set K1 < K2 to promote this nlp */
6       nlp = pow(sum, K1)/pnr;
7     } else {
8       nlp = pow(sum, K2)/pnr;
9     }
10      return nlp;
11  }
```

CALCULATE NLP 1004

FIG. 10

PROCESSOR(S) 1104

INSTRUCTIONS TO DETERMINE A NODE-LEVEL PARTITIONING BASED USE OF A POLICY SET FUNCTION 1108

INSTRUCTIONS TO GENERATE A SET OF POLICY BINS BY CREATING A NUMBER OF EQUAL-WIDTH BINS ON A GIVEN DIMENSION 1110

INSTRUCTIONS TO SCAN AN ORIGINAL POLICY SET TO DETERMINE A NUMBER OF POLICIES FALLING INTO EACH POLICY BIN IN THE SET OF POLICY BINS 1112

INSTRUCTIONS TO MEASURE AN ORIGINAL POLICY SET CHARACTERISTIC BASED ON THE NUMBER OF POLICIES FALLING INTO EACH POLICY BIN 1114

INSTRUCTIONS TO DETERMINE ONE OR MORE PARAMETERS THAT REPRESENT RELATIONSHIPS BETWEEN THE POLICY SET AND ANOTHER POLICY SET BASED AT LEAST ON THE A NUMBER OF POLICIES FALLING INTO EACH POLICY BIN AND THE POLICY SET CHARACTERISTIC 1116

INSTRUCTIONS TO SELECT THE APPROPRIATE NODE LEVEL PARTITIONING FOR THE ORIGINAL POLICY SET BASED ON THE SIMILARITY OF THE ORIGINAL POLICY SET AND OTHER KNOWN POLICY SETS 1118

INSTRUCTIONS TO GENERATE A NEW POLICY SEARCH TREE USING THE SELECTED NODE LEVEL PARTITIONING SCHEME, THE NEW POLICY SEARCH TREE PROVIDES IMPROVED BUILD COST AND/OR IMPROVED SEARCH COST 1120

NON-TRANSITORY COMPUTER-READABLE STORAGE MEDIUM 1106

SYSTEM 1102

FIG. 11

POLICY SET FEATURE GUIDED NODE LEVEL PARTITIONING FOR POLICY SEARCH TREE OPTIMIZATION

BACKGROUND

When an incoming packet arrives, network security devices (e.g., gateways, firewall-enabled routers, etc.) are required to find a policy matching the packet and act accordingly based on the policy packet handling definition. In an enterprise-level network security device, the policy search process has to perform well on various policy sets, including tens of thousands of policies, each with a single value, a range, or a wildcard on one or more given dimensions.

A policy search tree is a data structure used to organize and evaluate a set of policies, often in the context of network management, security rules, or access control. Each tree represents a hierarchy that simplifies decisions or operations related to policies. Conventionally, one or more policy search trees are created based on a given policy set—for example, a tree for Internet Protocol v4 (IPv4) and another for Internet Protocol v6 (IPv6). Or, during a different stage of policy search, a different tree can be used. For ease of implementation, a tree is usually created by treating the policy set under each node recursively in a repeated manner to determine how many child nodes (i.e., partition number) are branched out from the current node or to set the current node as a leaf, which has no child nodes.

Due to the variety of policy sets, finding a one-size-fits-all approach to get an efficient tree regarding tree creation time and search time is challenging when applied to each node. An inefficient tree is usually a big tree with many nodes and a correspondingly large image used by hardware (prolonged tree creation time), as well as more cache misses during tree search (prolonged tree search time). Therefore, current approaches suffer from inefficiencies.

BRIEF DESCRIPTION OF THE DRAWINGS

To easily identify the discussion of any particular element or act, the most significant digit or digits in a reference number refer to the figure number in which that element is first introduced.

FIG. 2 is a high-level flow diagram illustrating an example approach to policy set feature guided node level partitioning for policy search tree optimization.

FIG. 7A is example pseudocode to determine an entropy that can be used to represent PSF based on the policy bin results.

FIG. 7B is example pseudocode for calculating PB-based variance that can be used to represent PSF based on policy bin results.

FIG. 10 is example pseudocode for calculating NLP based on node-level policy bins.

FIG. 11 is an example of a system to perform an example approach to policy set feature guided node level partitioning for policy search tree optimization.

DETAILED DESCRIPTION

Figure 1:
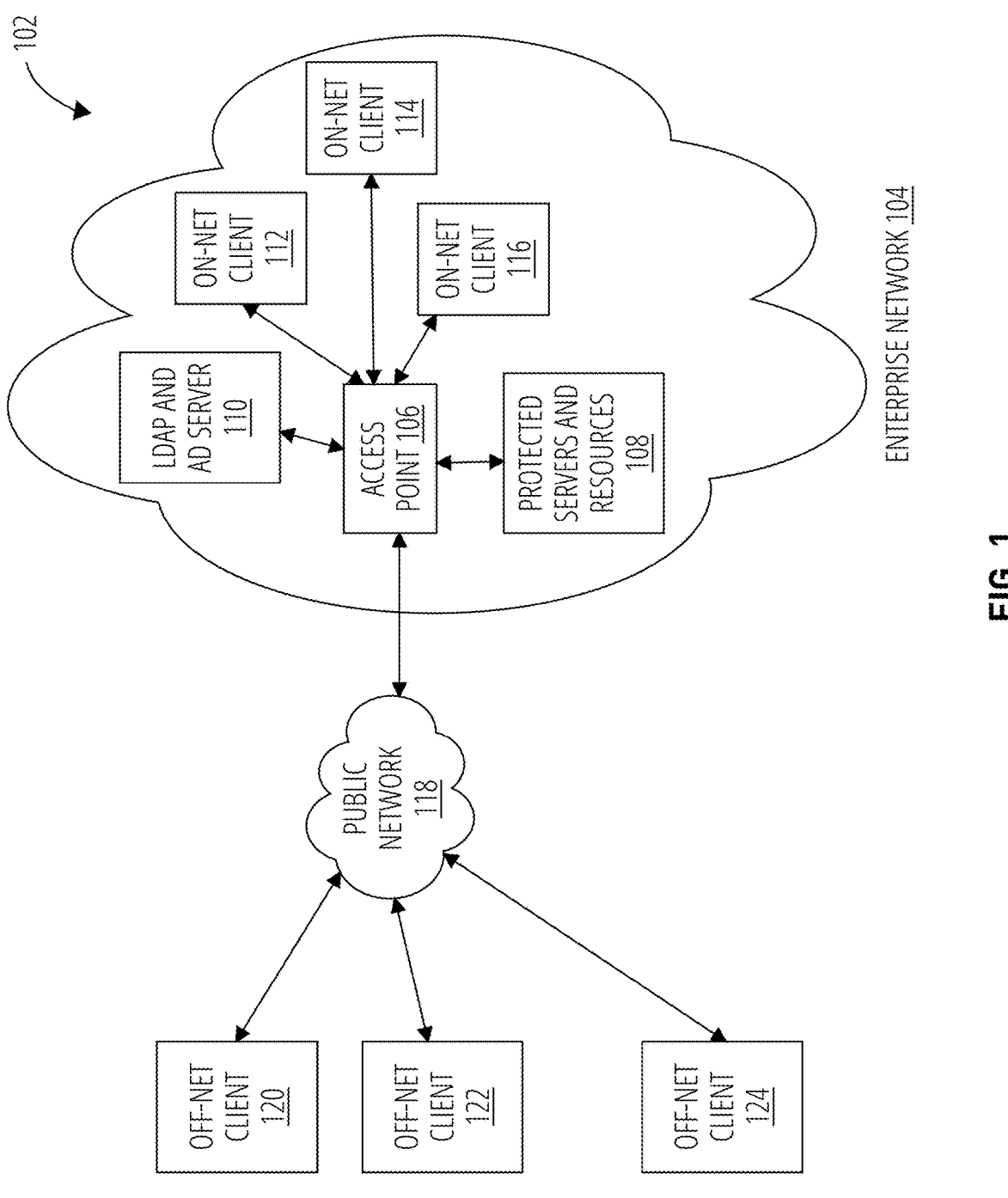
FIG. 1 is a block diagram of an architecture that can provide endpoint client authentication and application access control in a zero-trust network access (ZTNA) environment.

As stated above, a policy search tree is a data structure used to organize and evaluate a set of policies, often in the context of network management, security rules, or access control. Conceptually, each policy search tree as a "decision map" for a particular protocol or category. Protocols like IPv4 and IPV6 have different formats and constraints (e.g., IPv4 addresses are 32 bits, while IPv6 addresses are 128 bits). Having separate trees allows for more efficient, protocol-specific optimizations and ensures policies can be evaluated without unnecessary complexity or overlap.

The recursive nature of building the tree comes into play when breaking down a policy set-a collection of rules or conditions-into smaller, manageable partitions. Based on a specific criterion (e.g., address ranges, port numbers, or protocol types), the policy set is divided into subsets. Each subset becomes the responsibility of a new child node. This process can continue until a tree include multiple layers of child nodes. Thus, each policy set tree can be uniquely complex. At the lowest level of the tree structure, leaf nodes are where partitioning stops, and the policy or decision is identified. The number of child nodes created at each level (partition number) depends on the characteristics of the policy set. For example, for IP-based rules, partitions might be based on IP ranges, or for port-based rules, partitions might be grouped by port ranges (e.g., 0-1023 for "well-known ports" vs. 1024-49151 for "registered ports").

Policy set features (PSF) are attributes or characteristics that describe the policies. These features determine how policies are similar or distinct and thus help decide how to group them at different levels of the tree.

In light of the shortcomings described above, it would be helpful if an approach understood policy-set features when deciding the partition number on each node. In the approaches described below, a framework to map PSFs to a measurable value, and by using it as guidance, to determine how many child nodes should be derived from the current node. This approach can be integrated into existing tree creation processes without a significant overhaul, which benefits time-sensitive development and system upgrades.

As described in greater detail below, trials are conducted on a given node during the tree creation process to determine how many child nodes the current node should be cut into. In an example, trials are conducted on a set of partition numbers (PNRs). A PNR ranges from 2 to a max value MAX_PNR (e.g., 16, 32, 64, etc.), according to a hardware limit or software configurable value.

Terms and Definitions

Brief definitions of terms used throughout this application are given below.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/ tools of a given cybersecurity or networking security vendor or across a group of participating vendors achieve a more integrated security policy by facilitating interoperability and communication among the various cybersecurity products/ solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/ devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

As used herein, "node level partitioning" or "NLP" refers to a per-node partition function and its return value, based on the information that the node can see.

As used herein, "BEST_NLP" refers to the best NLP function and its return value.

As used herein, a "policy set feature" or "PSF" refers to a policy set discovering function and its return value.

As used herein, "policy binning" or "PB" refers to an approach to find a policy distribution on a given dimension.

As used herein, "node level policy binning" or "NLPB" refers to performing policy binning at the node level, based on the information that the node can sec.

As used herein, "partition number" or "PNR" refers to the number of partitions applied to each node to generate child nodes.

As used herein, "BEST_PNR" refers to the best PNR discovered by an NLP.

As used herein, "MAX_PNR" refers to the maximum value of PNR.

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

FIG. 1 is a block diagram illustrating operating environment 102 in which various embodiments of the present disclosure may be employed. In the context of the present example, multiple off-net clients (e.g., off-net client 120, off-net client 122, off-net client 124) access enterprise network 104 via public network 118 (e.g., the Internet). The off-net clients may represent endpoint or client devices (e.g., workstations, desktop computers, laptop computers, or mobile devices) used by remote workers associated with a particular organization or enterprise.

In an example, enterprise network 104 includes Lightweight Directory Access Protocol (LDAP) and Active Directory (AD) (LDAP and AD) server 110, access point 106, protected servers and resources 108, and multiple on-net clients (e.g., on-net client 112, on-net client 114, on-net client 116). In an example, the on-net clients are locally attached client devices used by onsite workers. In an example, access point 106 is a network security appliance operable within enterprise network 104. Access point 106 may be responsible for controlling access to protected servers and resources 108, which may include various protected network devices, servers, resources, services, TCP applications, and/or databases. For example, as is known in the art, access point 106 may evaluate policies to determine what devices and users can access a given target service of protected servers and resources 108.

In an example, when a given user session matches a policy, access point 106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 110 regarding a user's AD group and/or domain. For example, access to one or more of protected servers and resources 108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

One or more components illustrated in FIG. 1 can utilize Zero-Trust Network Access (ZTNA) technologies and functionalities that enable secure access to internal applications for local or remote users (e.g., utilizing on-net endpoint or client devices within an enterprise network or off-net endpoint or client devices outside of the enterprise network, respectively). ZTNA may be used to authenticate and authorize access to resources based on identity, device, and/or contextual data. ZTNA solutions typically grant access on a per-session basis to individual applications only after devices and users are verified.

FIG. 2 is a high-level flow diagram illustrating an example approach to policy set feature guided node level partitioning for policy search tree optimization.

In an example, a node-level partitioning is determined based use of a policy set function, 202. In an example a set of policy bins is generated by creating a number of equal-width bins on a given dimension, 204. In an example an original policy set is scanned to determine a number of policies falling into each policy bin in the set of policy bins, 206.

In an example, an original policy set characteristic is measured based on the number of policies falling into each policy bin, 208. In an example, the policy set characteristic is an entropy calculation, wherein the entropy calculation captures a feature of the policy distribution with a single value. In an example, the policy set characteristic comprises a variance calculation, wherein the variance calculation captures a feature of the policy distribution with a single value.

In an example, one or more parameters are determined that represent relationships between the policy set and another policy set based at least on a number of policies falling into each policy bin and the policy set characteristic, 210. In an example, the one or more parameters are at least sets of {PSF, BEST_NLP} value pairs.

In an example, the appropriate node level partitioning is selected for the original policy set based on the similarity of the original policy set and other known policy sets, 212. The selected node level partitioning is likely to be a better scheme as compared to a one-size-fits-all node level partitioning, for the original policy set. In an example, a new policy search tree is generated based on the selected node level partitioning, 214. The new policy search tree provides improved build cost and/or improved search cost as compared a search tree based on a one-size-fits-all node level partitioning. In an example, the new policy search tree is deployed, 216.

Subsequent flow diagrams and supporting figures provide additional description of various components of the example approach to policy set feature guided node level partitioning for policy search tree optimization provided in FIG. 2.

Figure 3:
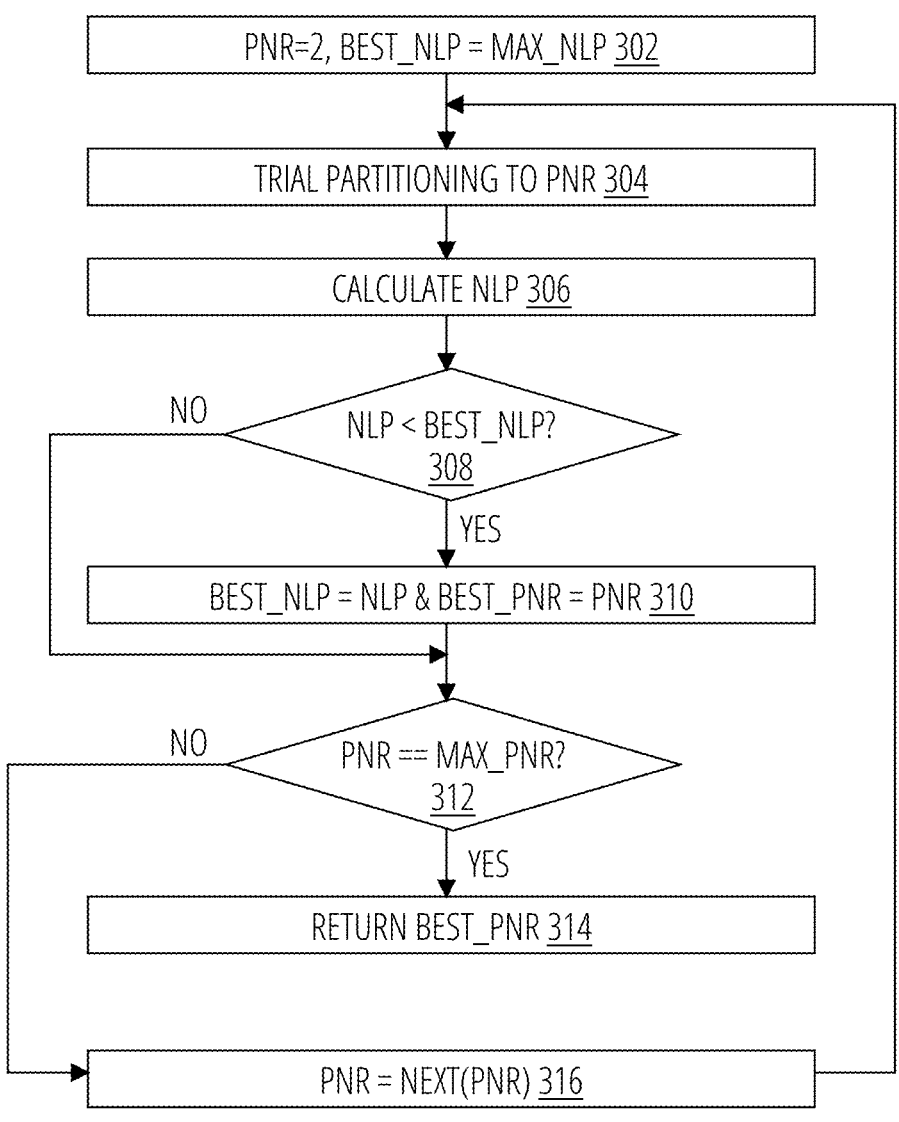
FIG. 3 is an example approach to partitioning a set of partition range numbers (PNRs) using trials.

FIG. 3 is an example approach to partitioning a set of partition range numbers (PNRs) using trials. That is, FIG. 3 provides a technique to use trials to find the best PNR. Initially, PNR is set to 2, and a variable to keep the best-measured value, BEST_NLP, is set to its maximum value, 302. In other configurations, an initial value other than 2 can be utilized (e.g., 4, 8). For each trial based on the current PNR value, 304, a node-level partitioning (NLP) function is used to measure the estimated effect of PNR, 306. For example, the following can be used to calculate NLP:

$$SUM=0$$

$$FOR(i=0;i<PNR;++i)$$

$$SUM+=polcnt[i]$$

$$NLP=SUM\char`^k/PNR$$

In this example, the NLP function maps the sum of policy count (polcnt) for all child nodes (SUM) to an NLP value. It should be noted that because some policies can encompass several bins, these policies are counted multiple times in SUM. Thus SUM/PNR is a measure of the average number of policies falling into a bin, which is why $SUM\char`^k/PNR$ is used (where $k>=1$). In this example, "k" is a constant value, such as 2. It can also be other values, to achieve better results for tree creation and tree search. There can also be other examples of NLP functions.

For simplicity, its return value is also called NLP in FIG. 3, 306. Without loss of generality, the NLP function is designed so that the smaller the estimated value, the better the estimated partitioning effect. The newly measured NLP value is compared with BEST_NLP, 308. If the new NLP is smaller, BEST_NLP is updated to the new NLP, and BEST_PNR remembers the current PNR, 310. The trial is repeated on each PNR from the selected PNR set 316, and eventually BEST_PNR is returned, 314.

In light of the above, one can see that conventional partitioning poses at least three challenges. First, in an ideal configuration, multiple NLPs (e.g., $NLP_0$, $NLP_1$, . . . , $NLP_m$) might be applied to different policy sets to achieve better results in terms of tree creation cost and tree search cost. However, choosing an NLP function given a policy set is a challenge. Second, if partitioning is determined locally within each node, certain information about the original PSF may never be utilized. How to use the PSF as a tree-level guidance, in addition to node-level decisions, is a challenge. Third, the framework should be flexible for future updates with new NLP and PSF functions.

Figure 4:
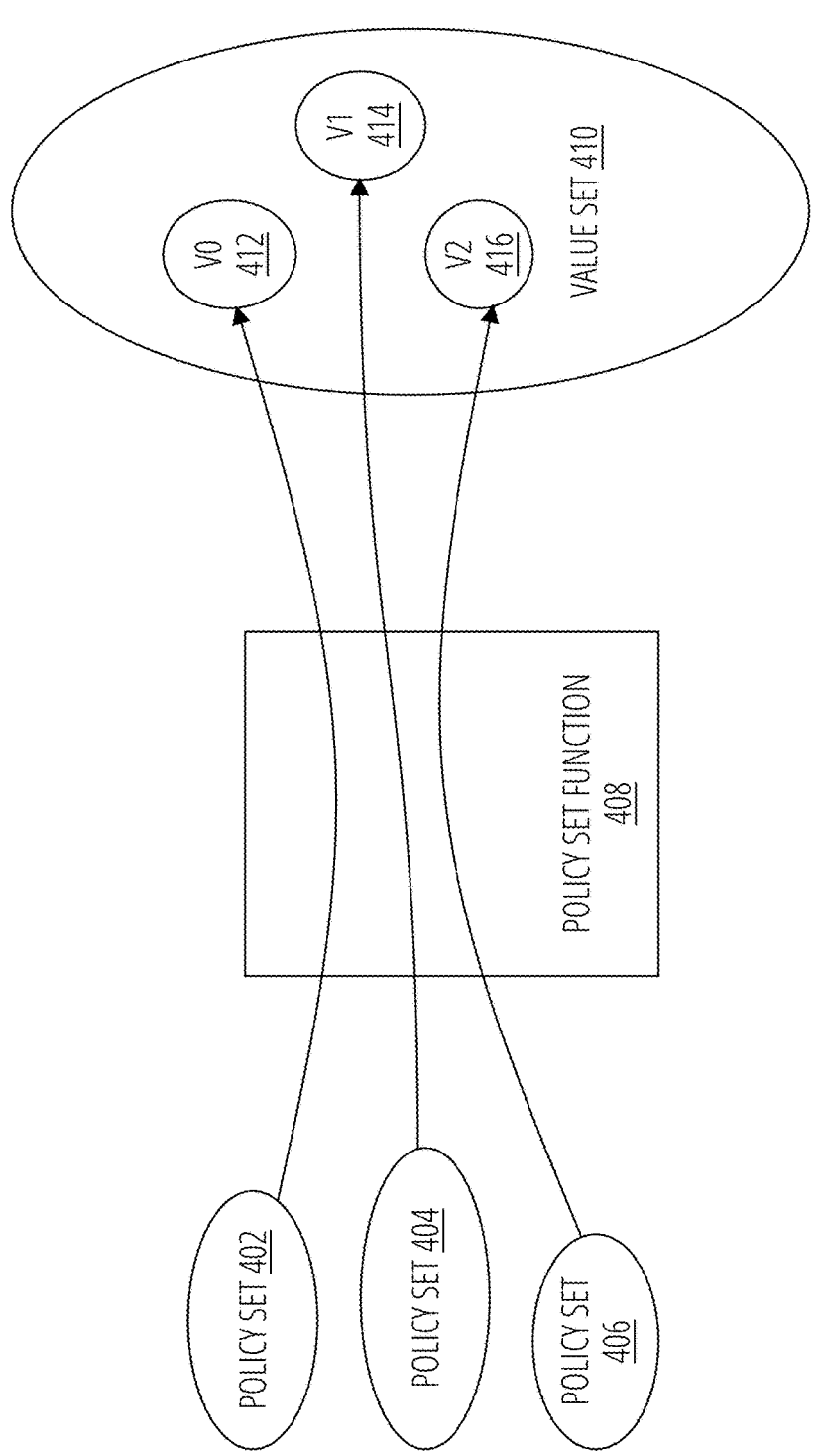
FIG. 4 is a conceptual illustration of a mapping of policy sets to values in a value set through a policy set function (PSF).
Figure 5:
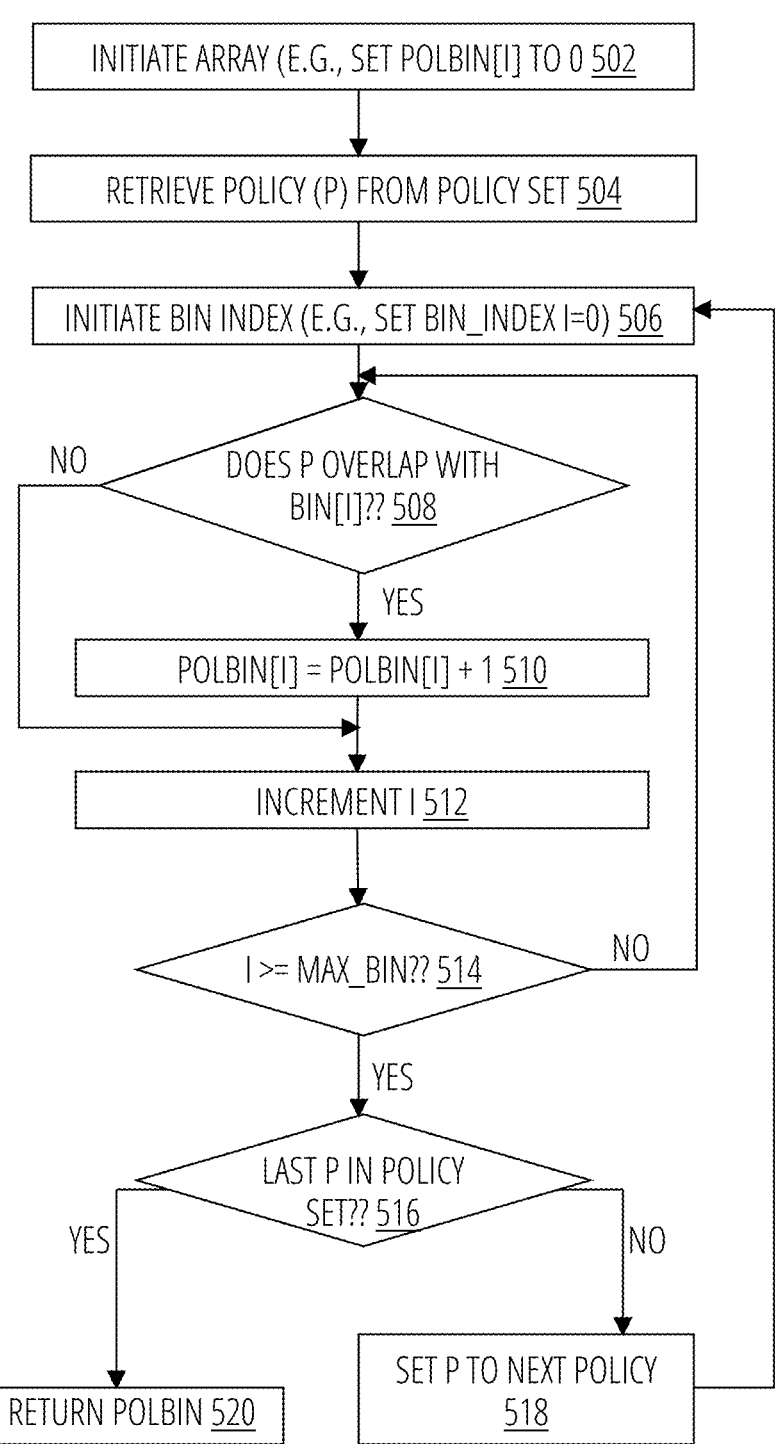
FIG. 5 is a flow diagram of an example approach to creating bins and determining the number of policies for each bin.

FIG. 4 is a conceptual illustration of a mapping of policy sets to values in a value set through a policy set function (PSF). A policy set has its own features. Some policy sets (e.g., policy set 402, policy set 404, policy set 406) have policies concentrated on one side of the spectrum of a given dimension, while some other policy sets have policies spread wider. Between policies, there can be a variety of degrees of overlaps. Without loss of generality, the policy set features can be mapped to specific values through a function called a policy set function, or PSF. As shown in FIG. 4, policy set function 408 maps policy set 402 to value V0 412 in value set 410. Similarly, policy set function 408 maps policy set 404 to value V1 414, and policy set 406 to value V2 416. In an example, policy set function 408 is a policy binning (PB) function; however, in other examples, different types of functions can be used. FIG. 5 provides an example of a PSF that is based on PB.

FIG. 5 is a flow diagram of an example approach to creating bins and determining the number of policies for each bin. More specifically, the example of FIG. 5 describes a technique that creates a number (MAX_BIN) of equal-width bins on a given dimension and scans the policy set to count the number of policies falling into each bin. In the example of FIG. 5, labeled the bins are labeled from 0 to (MAX_BIN−1). MAX_BIN can be any positive integer, but usually it is a value of power of 2, such as 32, 64, or 128. If the full range on a dimension is wider, a bigger number can be chosen to achieve the desired resolution. For example, a bigger MAX_BIN can be used for IPV6 (128 bits) than for IPV4 (32 bits), which can be bigger than that for TCP or UDP port (16 bits).

In an example, once MAX_BIN is chosen, an array ("polbin" with MAX_BIN elements) is initialized (e.g., to 0), 502. Then, a policy (p) is selected from the policy set, 504, and is checked whether p has an overlap with bin[i], 506. In an example, element i in polbin, i.e., polbin[i] increments only when there is an overlap, 510. In an example, in polbin calculation, 510, instead of simply incrementing polbin[i] by 1, the increment can be by 1/binent, where binent is the number of bins that the current policy has an overlap with. In certain cases, this technique gets better results.

This process goes over for all MAX_BIN bins, 512 and 514. Thereafter, the next policy is chosen, 518 until all policies in the given policy set are checked, 516 and 518. When this process finishes, polbin array is returned, 520. In an example, once the policy bin results (e.g., polbin) is available, it can be mapped to a PSF value through a PSF function.

In the example of FIG. 5, PB is used as a building block of PSF, which is further derived from entropy (FIG. 7A) or variance (FIG. 7B). In an example, PB can also be used within each node to become part of NLP. In an example, a node-level PB (NLPB) only scans the policy subset that the current node can see. According to one embodiment, described in the pseudocode in FIG. 10, node level PB results (nl_polbin), along with maxbin, sum (refer to 306 in FIG. 3), and pnr, are the input arguments. Either entropy (line 2 in FIG. 10) or variance (line 3 in FIG. 10) can be used. If entropy is used, when the entropy is smaller than a predefined threshold value (THRESHOLD, e.g., 0.5 or 0.75 or 0.8) and pnr is 2 (or 4 or 8), nlp is formulated with a smaller power (K1, e.g., 1.5) of sum (line 6 in FIG. 10); otherwise nlp is formulated with a bigger power (K2, e.g., 2) of sum (line 8 in FIG. 10). Eventually PNR 2 is more likely to be selected since a smaller NLP represents a better result (308 in FIG. 3).

Figure 6A:
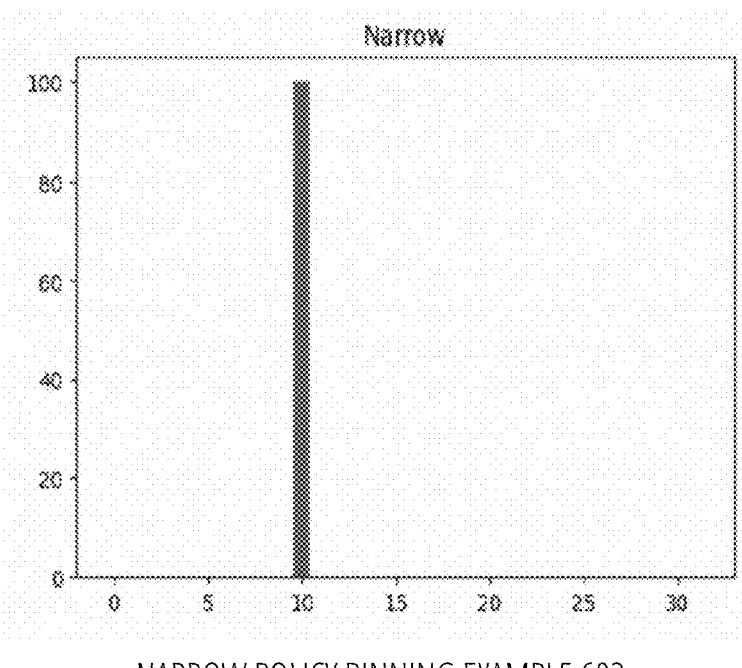
FIG. 6A is an example of narrow policy binning.

FIG. 6A is an example of narrow policy binning. The example of FIG. 6A is one where policies are assigned to a narrow range (or smaller number) of bins where the number of bins can be chosen as described above. The example of FIG. 6A is an extreme example where policy binning results in a policy set with 100 policies and a MAX_BIN value of 32. In FIG. 6A, all 100 policies are narrow and fill in a single bin (e.g., bin 10 in FIG. 6A).

Figure 6B:
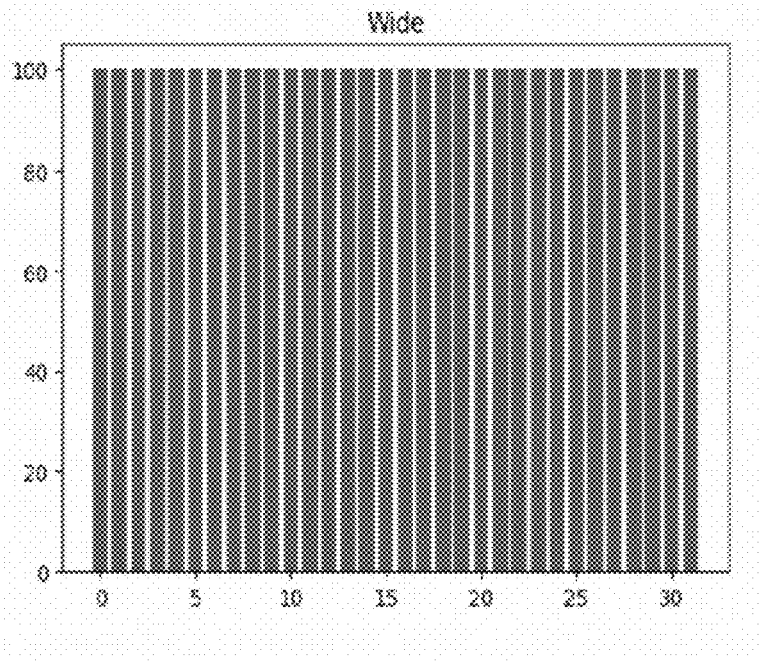
FIG. 6B is an example of wide policy binning.

FIG. 6B is an example of wide policy binning. The example of FIG. 6B is one where policies are assigned to a wide range (or larger number) of bins where the number of bins can be chosen as described above. The example of FIG. 6B is an extreme example where policy binning results in a policy set with 100 policies and a MAX_BIN value of 32. In FIG. 6A, all 100 policies are wide and fall into all of the bins of FIG. 6B.

The examples of FIG. 6A and FIG. 6B illustrate the edge possibilities for policy binning, real world examples will generally fall somewhere between these two extreme examples.

FIG. 7A is example pseudocode to determine an entropy that can be used to represent PSF based on the policy bin results. In the example of FIG. 7A, the pseudo function get_entropy has two arguments as the input, the aforementioned PB results polbin, and a variable maxbin (the lowercase maxbin instead of MAX_BIN represents a variable that is not determined by get_entropy itself), which can vary depending on the specific configuration on a given dimension. In line 13 of FIG. 7A, the entropy is normalized to a value between 0 to 1, by dividing its max possible value log 2(maxbin), which happens when all policies fall into all bins. On the other side of the spectrum, when all policies fall into a single bin only, entropy is 0, as in line 8, some polbin[i] is equal to sum_pb, so that r is 1. Thus, entropy can capture the feature of the policy distribution, based on polbin, with a single value.

FIG. 7B is example pseudocode for calculating PB-based variance that can be used to represent PSF based on policy bin results. According to another embodiment, variance can also be used to represent PSF based on policy bin results. In an example, the pseudo function get_variance has the same two arguments as input, polbin and maxbin. It calculates variance value var differently. In normalization step in line 14 of FIG. 7A, the max possible value of var before normalization is (pow(mu,2)*(maxbin−1)), which happens when all policies fall into a single bin only. On the other side of the spectrum, when all policies fall into all bins, variance is 0, as in line 14 of FIG. 7B, polbin[i] is equal to mu, which is the mean value of all bins.

Figure 8:
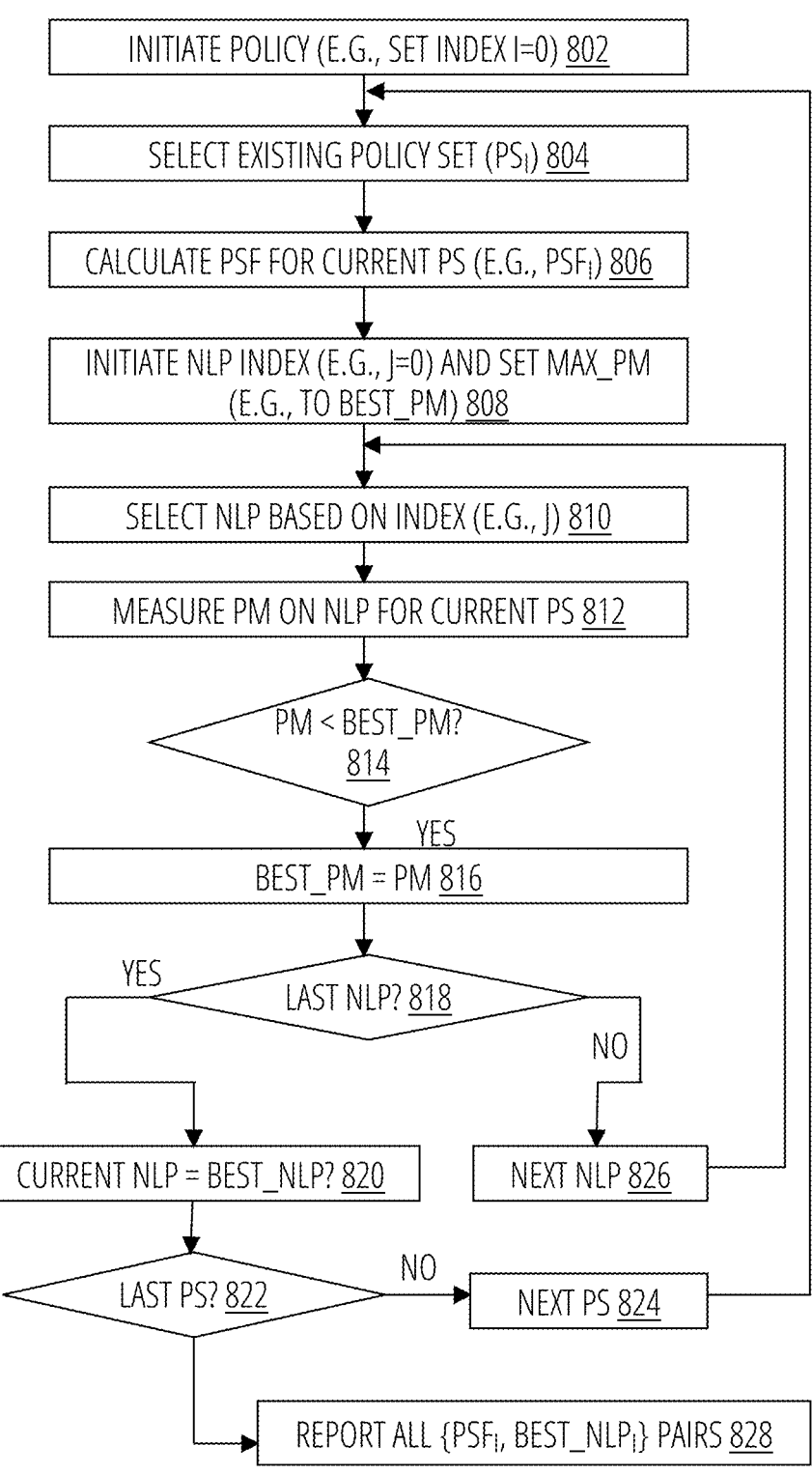
FIG. 8 is a flow diagram for an example approach to policy set feature guided partitioning.

FIG. 8 is a flow diagram for an example approach to policy set feature guided partitioning. Once the PSF function is ready, as illustrated in FIG. 4, the PSF function can be used to find the best node-level partitioning (NLP) process for a given policy set. In an example, the approach includes two stages, the training stage and the inference stage.

In an example, during the training stage, pairs of {PSF, BEST_NLP} are collected on existing policy sets. In an example, the policy set is initiated (e.g., the policy set index is set to 0), 802. Given one of existing policy sets (ps$_i$), 804, the corresponding PSF is calculated, 806, denoted by PSF$_i$. Thereafter, different NLPs are applied, 810, to the policy search tree creation and policy search tests are conducted on each tree, after being created, for performance evaluation, 812.

In an example, the performance is measured, 812, by a metric such as number of cycles per packet in a full speed process, represented by a number named performance measurement (PM). Then, the NLP that gives the best performance for policy set ps$_i$ is recorded as BEST_NLP$_i$. When this procedure is complete on all existing policy sets (814, 816, 818, 820, 822, 824, 826), all {$PSF_i$, $BEST\_NLP_i$} pairs have been evaluated, 828.

Figures 9A, 9B:
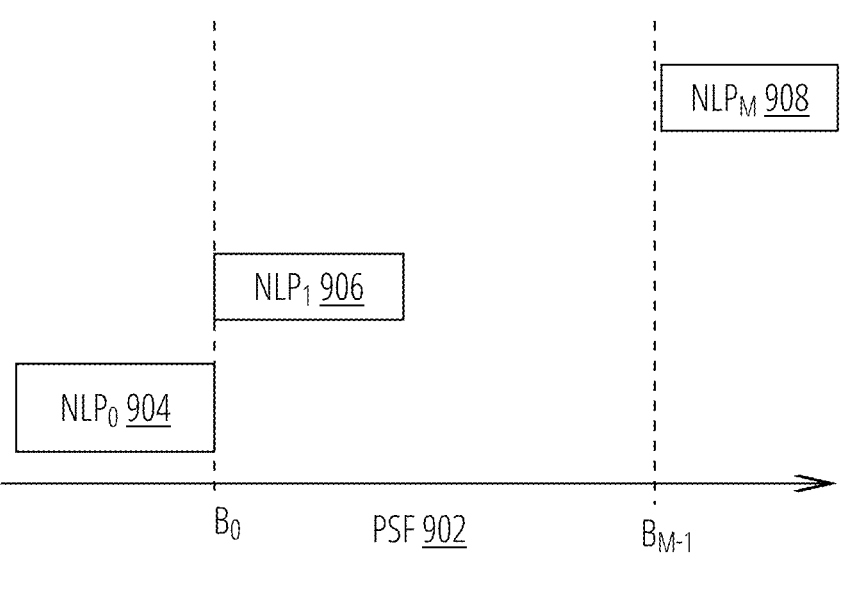
FIG. 9A is a conceptual illustration of best NLP zones based on PSF without overlap.
FIG. 9B is a conceptual illustration of best NLP zones based on PSF with overlap.

FIG. 9A is a conceptual illustration of best NLP zones based on PSF without overlap. The value of {$PSF_i$, $BEST\_NLP_i$} pairs represent a mapping relationship. As multiple BEST_NLPs within certain PSF range are likely to share the same NLP function, NLPs form clusters that may be separated by boundary values on PSF. Let $b_0$ be the boundary between $NLP_0$ and $NLP_1$, and $b_{m-1}$ the boundary between $NLP_{m-1}$, $NLP_m$, etc. FIG. 9A represents the scenario that boundaries are clear between NLPs.

FIG. 9B is a conceptual illustration of best NLP zones based on PSF with overlap. In contrast to the illustration of FIG. 9A, two neighboring NLPs may have an overlap. In other words, two policy sets lead to different best NLPs, although they have the same PSF, as illustrated by FIG. 9B. In an example, a middle value of the overlapped part can be chosen as the boundaries.

In some scenarios, when the mapping relationship between the PSF and the best NLP may not have a clear-cut boundary, PSF may be extended to more than one dimension, and machine learning techniques such as support vector machine (SVM) may be helpful to find an efficient solution. In an example, the PSF value can be used as a guidance to select the NLP function.

FIG. 10 is example pseudocode for calculating NLP based on node-level policy bins. Once the training is complete (or updated based on new policy sets), the mapping relationship between PSF and the best NLP can be applied to policy sets in the future.

In an example, if the mapping relationship between PSF and the best NLP is represented by FIG. 9A (without NLP overlap) or FIG. 9B (with some overlap but the boundaries are clear), the boundaries $b_0$, $b_1$, ..., $b_{m-1}$ are the parameters to be used for inference. In an example, if the mapping relationship between PSF and the best NLP is discovered by other techniques, the corresponding set of parameters or functions are to be used for inference.

In an example, when the mapping relationship between PSF and the best NLP is not clear, and a sophisticated technique is applied to all the existing policy sets, overfitting may happen, which works well for existing policy sets, but not as well for new policy sets. Therefore, strategies such as dividing existing policy sets into training samples and validation samples, or ensembling multiple mapping relationships based on different PSFs (e.g., both entropy and variance for each policy set).

In an example, PB can also be used within each node to become part of NLP. In an example, a node-level PB (NLPB) only scans the policy subset that the current node can see. According to one embodiment, described in the pseudocode in FIG. 10, node level PB results (nl_polbin), along with maxbin, sum (refer to 306 in FIG. 3), and pnr, are the input arguments. Either entropy (line 2 in FIG. 10) or variance (line 3 in FIG. 10) can be used. If entropy is used, when the entropy is smaller than a predefined threshold value (THRESHOLD, e.g., 0.5 or 0.75 or 0.8) and pnr is 2 (or 4 or 8), nlp is formulated with a smaller power (K1, e.g., 1.5) of sum (line 6 in FIG. 10); otherwise nlp is formulated with a bigger power (K2, e.g., 2) of sum (line 8 in FIG. 10). Eventually PNR 2 is more likely to be selected since a smaller NLP represents a better result (308 in FIG. 3).

FIG. 11 is an example of a system to perform an example approach to policy set feature guided node level partitioning for policy search tree optimization. In an example, system 1102 can include processor(s) 1104 and non-transitory computer-readable storage medium 1106. Non-transitory computer-readable storage medium 1106 may store instructions 1108, 1110, 1112, 1114, 1116, 1118 and 420 that, when executed by processor(s) 1104, cause processor(s) 1104 to perform various functions. Examples of processor(s) 1104 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 1106 include tangible media such as random-access memory (RAM), read-only memory (ROM), electrically erasable programmable read-only memory (EEPROM), flash memory, a hard disk drive, etc.

Instructions 1108 cause processor(s) 1104 to determine a node-level partitioning-based use of a policy set function.

Instructions 1110 cause processor(s) 1104 to generate a set of policy bins by creating a number of equal-width bins on a given dimension.

Instructions 1112 cause processor(s) 1104 to scan an original policy set to determine a number of policies falling into each policy bin in the set of policy bins.

Instructions 1114 cause processor(s) 1104 to measure an original policy set characteristic based on the number of policies falling into each policy bin. In an example, the policy set characteristic is an entropy calculation, wherein the entropy calculation captures a feature of the policy distribution with a single value. In an example, the policy set characteristic comprises a variance calculation, wherein the variance calculation captures a feature of the policy distribution with a single value.

Instructions 1116 cause processor(s) 1104 to determine one or more parameters that represent relationships between the policy set and another policy set based at least on a number of policies falling into each policy bin and the policy set characteristic. In an example, the one or more parameters are at least sets of {PSF, BEST_NLP} value pairs.

Instructions 1118 cause processor(s) 1104 to select the appropriate node level partitioning for the original policy set based on the similarity of the original policy set and other known policy sets.

Instructions 1120 cause processor(s) 1104 to generate a new policy search tree using the selected node level partitioning scheme, wherein the new policy search tree provides improved build cost and/or improved search cost as compared to a search tree based on a one-size-fits-all partitioning scheme.

Figure 12:
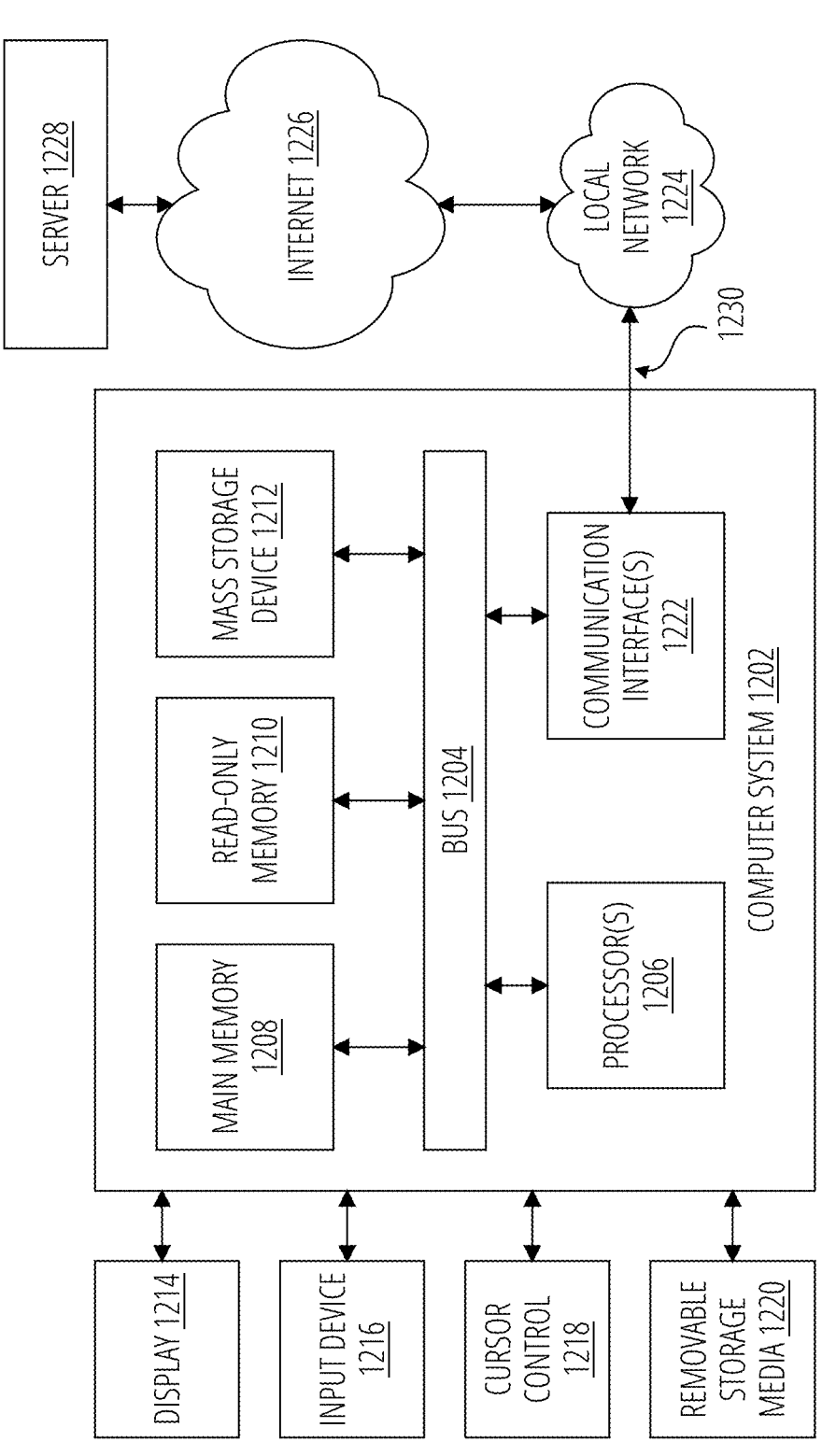
FIG. 12 is a block diagram that illustrates a computer system in which or with which an embodiment of the present disclosure may be implemented.

FIG. 12 is a block diagram that illustrates a computer system in which or with which an embodiment of the present disclosure may be implemented. Computer system 1202 may be representative of an endpoint or client device (e.g., one of the off-net clients or on-net clients) on which an endpoint security agent is running and acting as a proxy on behalf of a client application (e.g., a browser). Notably, components of computer system 1202 described herein are meant only to exemplify various possibilities. In no way should example computer system 1202 limit the scope of the present disclosure. In the context of the present example, computer system 1202 includes bus 1204 or other communication mechanism for communicating information and one or more processing resources (e.g., one or more hardware processor(s) 1206) coupled with bus 1204 for processing information. Hardware processor(s) 1206 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 1202 also includes main memory 1208, such as a random-access memory (RAM) or other dynamic storage device, coupled to bus 1204 for storing information and instructions to be executed by processor(s) 1206. Main memory 1208 also may be used for storing temporary variables or other intermediate information during execution of instructions to be executed by processor(s) 1206. Such instructions, when stored in non-transitory storage media accessible to processor(s) 1206, render computer system 1202 into a special-purpose machine customized to perform the operations specified in the instructions.

Computer system 1202 includes a read-only memory 1210 or other static storage device coupled to bus 1204 for storing static information and instructions for processor(s) 1206. Mass storage device 1212 (e.g., a magnetic disk, optical disk or flash disk (made of flash memory chips), is provided and coupled to bus 1204 for storing information and instructions.

Computer system 1202 may be coupled via bus 1204 to display 1214 (e.g., a cathode ray tube (CRT), Liquid Crystal Display (LCD), Organic Light-Emitting Diode Display (OLED), Digital Light Processing Display (DLP) or the like, for displaying information to a computer user. Input device 1216, including alphanumeric and other keys, is coupled to bus 1204 for communicating information and command selections to processor(s) 1206. Another type of user input device is cursor control 1218, such as a mouse, a trackball, a trackpad, or cursor direction keys for communicating direction information and command selections to processor(s) 1206 and for controlling cursor movement on display 1214. This input device typically has two degrees of freedom in two axes, a first axis (e.g., x) and a second axis (e.g., y), that allows the device to specify positions in a plane.

Removable storage media 1220 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1202 may implement the techniques described herein using customized hard-wired logic, one or more ASICs or FPGAs, firmware or program logic which in combination with the computer system causes or programs computer system 1202 to be a special-purpose machine. According to one embodiment, the techniques herein are performed by computer system 1202 in response to processor(s) 1206 executing one or more sequences of one or more instructions contained in main memory 1208. Such instructions may be read into main memory 1208 from another storage medium, such as mass storage device 1212. Execution of the sequences of instructions contained in main memory 1208 causes processor(s) 1206 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 1212. Volatile media includes dynamic memory, such as main memory 1208. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 1204. Transmission media can also be acoustic or light waves, such as those generated during radio-wave and infrared data communications.

Various forms of media may be involved in carrying one or more sequences of one or more instructions to processor(s) 1206 for execution. For example, the instructions may initially be carried on a magnetic disk or solid-state drive of a remote computer. The remote computer can load the instructions into its dynamic memory and send the instructions over a telephone line using a modem. A modem local to computer system 1202 can receive the data on the telephone line and use an infra-red transmitter to convert the data to an infra-red signal. An infra-red detector can receive the data from the infra-red signal, and appropriate circuitry can place the data on bus 1204. Bus 1204 carries the data to main memory 1208, from which processor(s) 1206 retrieve and execute the instructions. The instructions received by main memory 1208 may optionally be stored on mass storage device 1212 either before or after execution by processor(s) 1206.

Computer system 1202 also includes communication interface(s) 1222 coupled to bus 1204. Communication interface(s) 1222 provides a two-way data communication coupling to network link 1230 that is connected to local network 1224. For example, communication interface(s) 1222 may be an integrated services digital network (ISDN) card, cable modem, satellite modem, or a modem to provide a data communication connection to a corresponding type of telephone line. Another example is communication interface(s) 1222, which may be a local area network (LAN) card that provides a data communication connection to a compatible LAN. Wireless links may also be implemented. In any such implementation, communication interface(s) 1222 sends and receives electrical, electromagnetic or optical signals that carry digital data streams representing various types of information.

Network link 1230 typically provides data communication through one or more networks to other data devices. Local network 1224 and internet 1226 both use electrical, electromagnetic or optical signals that carry digital data streams. The signals through the various networks and network link 1230 and through communication interface(s) 1222, which carry the digital data to and from computer system 1202, are example forms of transmission media.

Computer system 1202 can send messages and receive data, including program code, through the network(s), network link 1230 and communication interface(s) 1222. In the Internet example, server 1228 might transmit a requested code for an application program through internet 1226, local network 1224 and communication interface(s) 1222. The received code may be executed by processor(s) 1206 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and case of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A method for reducing policy search tree build costs and search costs by improving node level partitioning with policy set features, the method comprising:

determining a node-level partitioning based use of a policy set function;

generating a set of policy bins by creating a number of equal-width bins on a given dimension;

scanning an original policy set to determine a number of policies falling into each policy bin in the set of policy bins;

measuring an original policy set characteristic based on the number of policies falling into each policy bin;

determining one or more parameters that represent relationships between the policy set and another policy set based at least on a number of policies falling into each policy bin and the policy set characteristic;

selecting the appropriate node level partitioning for the original policy set based on a similarity of the original policy set and other policy sets;

generating a new policy search tree using the selected node level partitioning scheme; and deploying the new policy search tree.

2. The method of claim 1, wherein the new policy search tree provides improved build cost or improved search sit as compared to a search tree based on a one-size-fits-all partitioning scheme.

3. The method of claim 1, wherein the policy set function maps one or more policy sets to values in a value set.

4. The method of claim 1, wherein the policy set characteristic comprises an entropy calculation, wherein the entropy calculation captures a feature of the policy distribution with a single value.

5. The method of claim 1, wherein the policy set characteristic comprises a variance calculation, wherein the variance calculation captures a feature of the policy distribution with a single value.

6. The method of claim 1, wherein the one or more parameters comprise at least sets of {PSF, BEST_NLP} value pairs.

7. The method of claim 1, wherein scanning an original policy set to determine a number of policies falling into each policy bin in the set of policy bins comprises utilizing a node-level partitioning (NLP) function to map a sum of policy counts for all child nodes to an NLP value.

8. A non-transitory computer readable storage medium having stored therein instructions that, when executed by one or more processors, cause the one or more processors to:

determine a node-level partitioning based use of a policy set function;

generate a set of policy bins by creating a number of equal-width bins on a given dimension;

scan an original policy set to determine a number of policies falling into each policy bin in the set of policy bins;

measure an original policy set characteristic based on the number of policies falling into each policy bin;

determine one or more parameters that represent relationships between the policy set and another policy set based at least on a number of policies falling into each policy bin and the policy set characteristic;

select the appropriate node level partitioning for the original policy set based on a similarity of the original policy set and other policy sets;

generate a new policy search tree using the selected node level partitioning scheme; and deploy the new policy search tree.

9. The non-transitory computer readable storage medium of claim 8, wherein scanning an original policy set to determine a number of policies falling into each policy bin in the set of policy bins comprises utilizing a node-level partitioning (NLP) function to map a sum of policy counts for all child nodes to an NLP value.

10. The non-transitory computer readable storage medium of claim 8, wherein the policy set function maps one or more policy sets to values in a value set.

11. The non-transitory computer readable storage medium of claim 8, wherein the policy set characteristic comprises an entropy calculation, wherein the entropy calculation captures a feature of the policy distribution with a single value.

12. The non-transitory computer readable storage medium of claim 8, wherein the policy set characteristic comprises a variance calculation, wherein the variance calculation captures a feature of the policy distribution with a single value.

13. The non-transitory computer readable storage medium of claim 8, wherein the one or more parameters comprise at least sets of {PSF, BEST_NLP} value pairs.

14. The non-transitory computer readable storage medium of claim 8, wherein the new policy search tree provides improved build cost or improved search sit as compared to a search tree based on a one-size-fits-all partitioning scheme.

15. A system comprising:

a storage subsystem having a plurality of data storage devices;

one or more hardware processors coupled with the storage subsystem, the one or more hardware processors configurable to:

determine a node-level partitioning based use of a policy set function;

generate a set of policy bins by creating a number of equal-width bins on a given dimension;

scan an original policy set to determine a number of policies falling into each policy bin in the set of policy bins;

measure an original policy set characteristic based on the number of policies falling into each policy bin;

determine one or more parameters that represent relationships between the policy set and another policy set based at least on a number of policies falling into each policy bin and the policy set characteristic;

select the appropriate node level partitioning for the original policy set based on a similarity of the original policy set and other policy sets;

generate a new policy search tree using the selected node level partitioning scheme; and deploy the new policy search tree.

16. The system of claim 15, wherein the policy set function maps one or more policy sets to values in a value set.

17. The system of claim 15, wherein the policy set characteristic comprises an entropy calculation, wherein the entropy calculation captures a feature of the policy distribution with a single value.

18. The system of claim 15, wherein the policy set characteristic comprises a variance calculation, wherein the variance calculation provides at least a mean value of all bins.

19. The system of claim 15, wherein the one or more parameters comprise at least sets of {PSF, BEST_NLP} value pairs.

20. The system of claim 15, wherein the new policy search tree provides improved build cost or improved search sit as compared to a search tree based on a one-size-fits-all partitioning scheme.

* * * * *